UNITED STATES PATENT OFFICE.

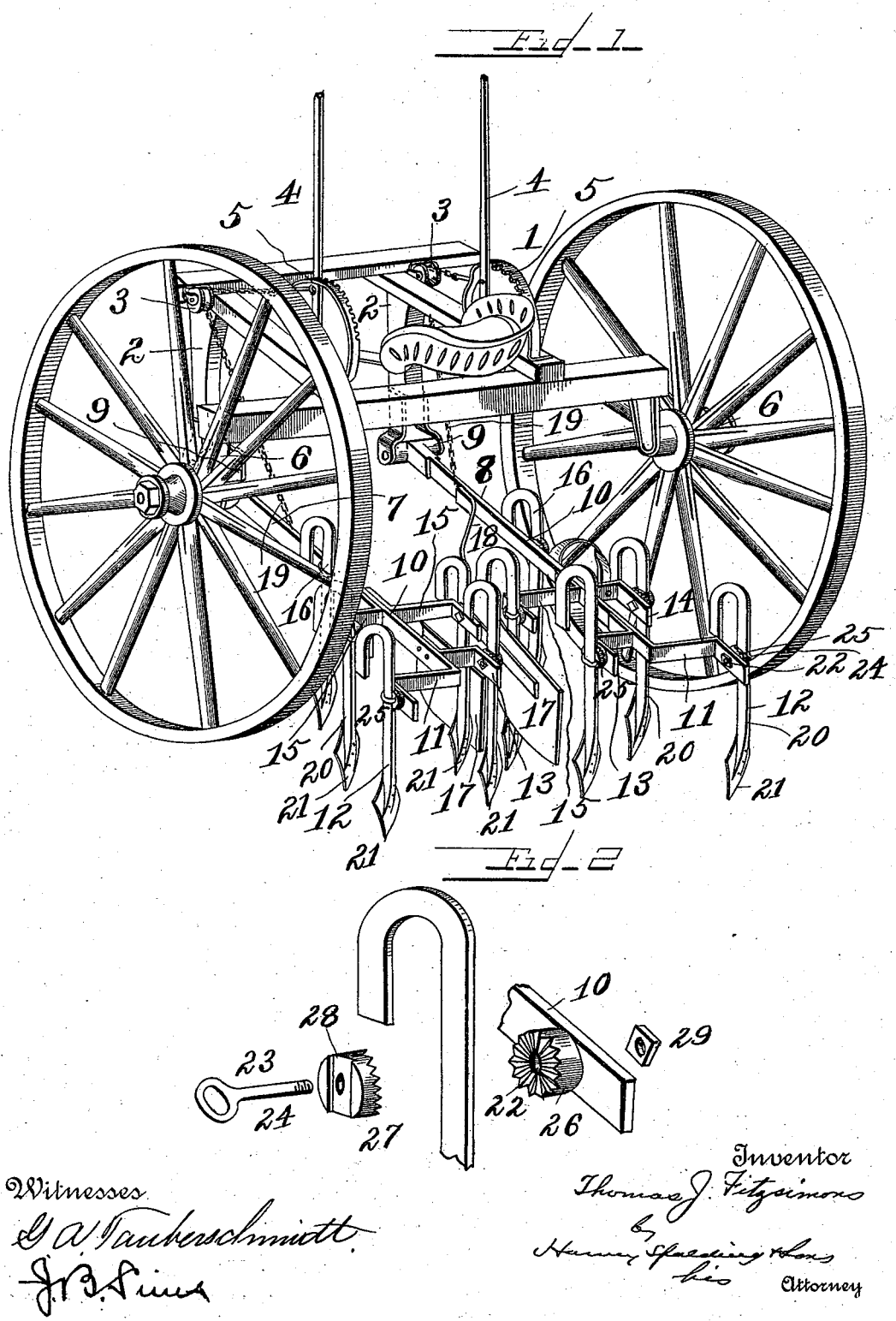

THOMAS J. FITZSIMONS, OF RAPIDAN, MINNESOTA.

WHEEL-CULTIVATOR.

SPECIFICATION forming part of Letters Patent No. 488,884, dated December 27, 1892.

Application filed June 1, 1892. Serial No. 435,221. (No model.)

*To all whom it may concern:*

Be it known that I, THOMAS J. FITZSIMONS, a citizen of the United States, residing at Rapidan, in the county of Blue Earth and State of Minnesota, have invented certain new and useful Improvements in Wheel-Cultivators, of which the following is a specification.

My invention relates to an improvement in wheel cultivators, the object being to provide an effective and durably constructed machine in which the shovels are independently adjustable, and so arranged relatively, that clogging is avoided.

The invention consists in the combination with a suitable frame and elevating levers, of two independent skeleton frames of particular construction, carrying adjustable shovels.

The invention further consists in the features of construction and combinations of devices, hereinafter fully described and specified in the appended claims.

In the accompanying drawings Figure 1 is a perspective view of a cultivator embodying my invention, and Fig. 2 is a detail view, showing one of the shovels detached.

The frame 1 of the machine is provided with depending bars 2, chain pulleys 3, levers 3' and racks 4, the whole supported by wheels arranged upon the crank axle 6.

7 and 8 indicate two skeleton shovel frames, pivotally secured at their front ends 9, to the depending bars 2. As these frames are counterparts in construction a description of one will suffice for both. Each frame consists of a longitudinal bar 10, terminating at its rear end in an angle-arm 11, to which the rear shovel 12, is secured. I preferably employ five shovels on each frame.

13 indicates an angle-arm secured to the frame in advance of the rear shovel 12, and some distance therefrom laterally.

14 and 15 are angle-arms arranged opposite to each other on opposite sides of the main bar of the frame. Each of the four angle-arms 11, 13, 14 and 15 carries a shovel. The manner of attaching and adjusting the shovels will be described hereinafter. The forward shovel 16 is secured directly to the main bar 10 of the frame.

17 indicates a guard or shield arranged adjacent to the innermost shovel of the frame, and secured to a bent metallic strap 18, the front end of which is secured to the bar 10. A chain 19, is attached at one end to the shovel frame, and at its opposite end to the adjacent lever.

Each of the shovels consists of a shank 20, and a point 21, detachably secured to the shank by bolts or otherwise. The shank is held in place by the following described devices. Each of the angle-arms of the frame, as well as the front portion of the bar 10, is provided with a transverse opening 22, to receive an eye-bolt 23. The head 24 of the bolt passes through a rosette coupling 25, consisting of a stationary section 26, fixed upon the angle-arm, and a removable section 27, held in place by the bolt-eye or head. The outer side of this removable rosette section is formed with a slot or seat 28, to receive the shank of the shovel, which passes through the eye of the bolt, and is firmly clamped in the seat 28, by the nut 29, of the eye-bolt. It will thus be seen that the shovels may be readily adjusted and detached from their connections, and also that each shovel frame may be raised by the lifting levers.

The relative arrangement of the shovels laterally, is such that sods, or large lumps of earth are thrown between the shovels and under the main bar 10, thus avoiding clogging of the shovels.

I claim—

1. In a wheel cultivator, the combination with the main frame and the depending bars 2, of shovel frames pivotally secured to the said bars, and each consisting of a main bar 10, terminating at its rear end in an angle-arm 11, and angle-arms 13, 14 and 15 secured on opposite sides of said bar 10, and a guard 17, secured to the bar 10 by a strap 18, substantially as described.

2. In a wheel-cultivator, the combination with the main frame and the pivoted shovel-frames of angle-arms, secured to said shovel-frames, and shovels each secured to said angle-arms, by an eye-bolt 23, and a rosette coupling consisting of the sections 26 and 27, said section 27 being formed with a seat 28, to receive the shank of the shovel, substantially as described.

In witness whereof I hereunto set my hand in the presence of two witnesses.

THOMAS J. FITZSIMONS.

Witnesses:
W. H. COLE,
BURT COLE.